United States Patent [19]

Reinauer

[11] Patent Number: 4,784,535
[45] Date of Patent: Nov. 15, 1988

[54] CUTTING TOOL

[75] Inventor: Josef Reinauer, Sigmaringen, Fed. Rep. of Germany

[73] Assignee: Firma Gottlieb Gühring, Ebingen, Fed. Rep. of Germany

[21] Appl. No.: 31,281

[22] Filed: Mar. 30, 1987

[30] Foreign Application Priority Data

Apr. 7, 1986 [DE] Fed. Rep. of Germany ....... 3611672

[51] Int. Cl.$^4$ ............................................ B23B 27/16
[52] U.S. Cl. ..................................... 408/173; 408/155
[58] Field of Search ............... 408/153, 155, 156, 173, 408/179, 190, 713, 714, 229

[56] References Cited

U.S. PATENT DOCUMENTS 3,434,190 3/1969 Kaiser ..................... 29/95

FOREIGN PATENT DOCUMENTS

| 0039539 | 11/1981 | European Pat. Off. . |
| 492295 | 2/1930 | Fed. Rep. of Germany ...... 408/153 |
| 2505515 | 8/1975 | Fed. Rep. of Germany . |
| 2948250 | 7/1981 | Fed. Rep. of Germany . |
| 2363902 | 7/1982 | Fed. Rep. of Germany . |
| 1266970 | 6/1961 | France ................ 408/153 |
| 2140723 | 1/1973 | France . |
| 1040373 | 8/1966 | United Kingdom . |
| 1075132 | 7/1967 | United Kingdom . |
| 1252275 | 11/1967 | United Kingdom . |
| 1107634 | 3/1968 | United Kingdom . |

OTHER PUBLICATIONS

Journal: "tz fur Metallbearbeitung", 75th annual volume, 1981, edition 12/81, p. 48.

Primary Examiner—Eugene F. Desmond
Attorney, Agent, or Firm—Oblon, Fisher, Spivak, McClelland & Maier

[57] ABSTRACT

A cutting tool is described which comprises at least one exchangeable cutting blade mounted on a parallelepiped cutting blade holder which in turn is adapted to be fixed by a setscrew at a tool body. The setscrew passes through the cutting blade holder such that the holder is pressed flat against a first recess surface and, at the same time, in the direction of a second recess surface extending at an angle with respect to the first one, the setscrew penetrating the cutting blade holder with clearance for freely adjustable fastening such that it includes an angle of substantially the same size with both recess surfaces and presses the cutting blade holder against the second recess surface by two adjustable support members of which at least one is designed as a rotatable eccentric pin the axis of which extends substantially parallel to the associated second recess surface and which is supported in a fitting recess of the cutting blade holder or of the tool body. The eccentric pin is retained in the fitting recess by a hairpin-type spring whereby very simple and economic assembly is obtained of the cutting blade holder and the eccentric pin.

22 Claims, 5 Drawing Sheets

CUTTING TOOL

BACKGROUND OF THE INVENTION

1. Field of the Invention

The instant invention relates to a cutting tool comprising at least one exchangeable cutting blade mounted on a parallelepiped cutting blade holder which is adapted to be fixed at a tool body by a setscrew passing through the cutting blade holder such that the holder is pressed flat against a first recess surface and, at the same time, in the direction of a second recess surface extending at an angle with respect to the first one, the setscrew penetrating the cutting blade holder with clearance for freely adjustable fastening such that it includes an angle of substantially the same size with both recess surfaces and presses the cutting blade holder against the second recess surface by two adjustable support members of which at least one is designed as a rotatable eccentric supporting pin the axis of which extends substantially parallel to the associated second recess surface and which is supported in a fitting recess of the cutting blade holder or of the tool body.

2. Discussion of the Background

DE-OS 25 05 515 discloses a cutting tool which comprises at least one exchangeable cutting blade which is attached to a prismatic cutting blade holder received in a corresponding recess formed in the tool body. The cutting blade holder itself is adapted to be fastened at the tool body by a setscrew which penetrates the cutting blade holder such that the holder is pressed flat against a first recess surface and, at the same time, in the direction of a second recess surface which extends at an angle with respect to the first one.

The cutting blade holder is fixed by means of a central setscrew and the fixing in position is obtained by means of edge surfaces of the cutting blade itself which can be moved into abutting contact with supporting surfaces of the cutting blade holder. The setscrew thus presses the cutting blade holder against a first recess surface in such manner that, at the same time, the cutting blade can be centered at the supporting surfaces. In the final analysis this has the consequence that adjustment of the cutting blade holder is no longer possible with this cutting tool because the setting up and orientation of the cutting blade are determined by the configuration of the recesses and supporting or bearing surfaces of the tool body.

There is a general need for more varied or universal application of the tool body and cutting plate holders in view of the fact that any cutting tools fitted with cutting blades or small cutting plates are very expensive. In the course of this development a universal tool body came to be fitted with adjustable cutting blade holders, so-called interchangeable or insert blade cassettes, thus providing a subassembly which permits a variety of special machining processes to be carried out in a single working pass by selectively combining the individual cassettes. Such a tool subassembly is described, for example, in the journal "tz für Metallverarbeitung", vol. 12/81. In the case of the aggregate known from this journal the cutting blade holders are received so as to be adjustable in axial fitting bores, each cutting blade holder in turn carrying a radially displaceable blade or tip carrier.

With modern special tools which are intended to produce a number of closely tolerated functional surfaces in a single operating step which surfaces, moreover, must be in closely tolerated relative positional arrangement, however, it was found that it is not sufficient to adjust the cutting blade in axial and radial directions each with a translatory direction of movement. Rather, it proved to be desirable to provide the possibility of tilting adjustment of the cutting blade and thus of the interchangeable blade cassette so that the setting angle or blade angle with respect to the direction of advance can be fixed accurately. It is the task of the manufacturer of such special tools to provide the user with a tool in which the individual cutting blade holders already are aligned accurately with respect to each other so that all the user has to do is to clamp the tool in the respective machine tool.

The adjustment of such special tools usually requires high precision optical means so that the adjusting procedure becomes rather expensive. For this reason the fastening of the holders of the cutting blades or plates at the tool body must be so secure that the cutting blade holders cannot become misaligned during shipment or use of the special tool. Yet on the other hand there is the demand that the adjustment of the cutting blade holder be realizable by very simple manipulations so that the adjusting can be carried out in little time.

Figure 1:
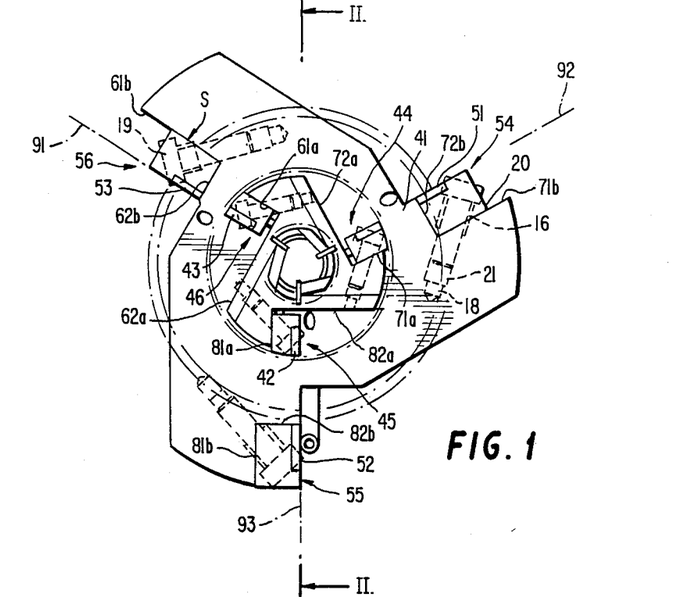
FIG. 1 is a front elevational view of a known cutting tool fitted with a plurality of cutting blade cassettes.
Figure 2:
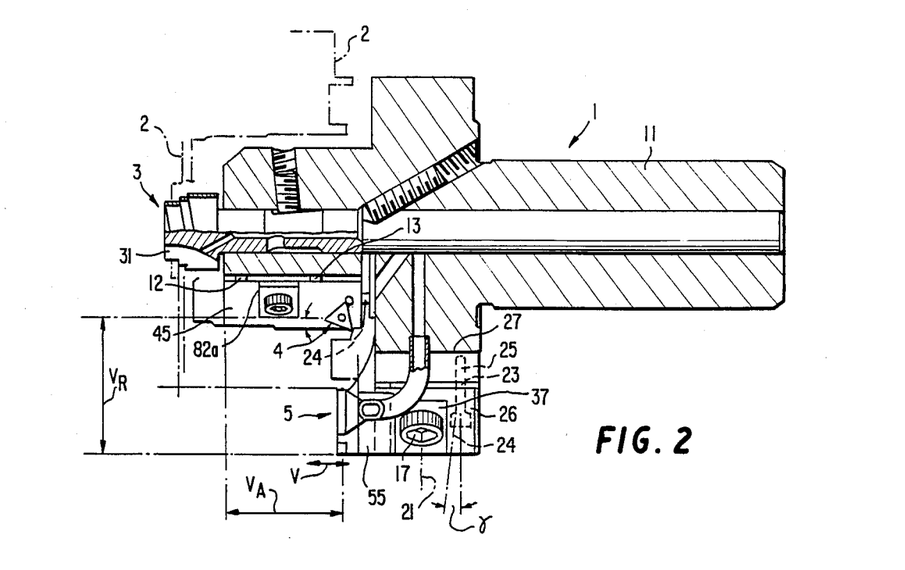
FIG. 2 is a sectional elevation of the tool shown in FIG. 1, the cut following line II—II in FIG. 1.

DE-OS 33 27 478 describes a cutting tool with which additional safety measures can be dispensed with, such as the provision of seals on fastening means for the interchangeable blade cassettes to eliminate undesired adjustments. With this cutting tool the exchangeable cutting blade is mounted on a prismatic cutting blade holder which is adapted to be fixed at the tool body by a setscrew passing through the cutting blade holder such that the holder is pressed flat against a first recess surface and, at the same time, in the direction of a second recess surface extending at an angle with respect to the first one. The setscrew penetrates the cutting blade holder for freely adjustable fastening with clearance such that it includes an angle of substantially the same size with both recess surfaces and presses the cutting blade holder against the second recess surface by way of two adjustable support members. The adjustable support members are embodied by supporting screws which act through cutting blade holders such that the tip of the screw which is to effect the support projects substantially vertically above the surface of the cutting blade holder facing the second recess surface. FIGS. 1 and 2 which will be described in greater detail below show such a cutting tool.

This known cutting tool proved rather successful in practical application because simple manipulations assure that the cutting blade holder is fixed at the tool body in a statically defined manner and without becoming loose. The clearance between the setscrew and the corresponding recess provided in the cutting blade holder readily may be kept so large that the necessary translatory and rotational adjustment degrees of freedom are made available which are within very close limits. The stability of the cutting blade holder is not impaired by the bore receiving the setscrew. This is all the more so as the flat surface contact into which the cutting blade holder is pressed provides an effect which increases the stability and creates good conditions for having the main cutting forces accommodated with the least possible loading of the cutting blade holder.

Such a cutting tool is rather expensive because of the accuracy required in adjustment and fitting. For this reason it can be used especially economically only if the tool body is furnished with a plurality of such cutting blade holders. In this event the tool may be applied so as to produce numerous functional surfaces having a predetermined and very closely tolerated positional association in just one pass. This requires the individual cutting blade holders to be fixed at the tool body staggered radially and/or axially and/or in circumferential direction in the most limited space. The cutting tool according to DE-OS 33 27 478 was of such structure that, while the supporting screws were freely accessible, the cutting blade holders not always could be mounted in a sufficiently small space. Often excessive displacements of the individual cutting blade holders had to be put up with in order to guarantee the accessibility of the fastening screws and supporting screws of each individual cutting blade holder. That led to an increase of the masses being moved and this could influence the dynamic cutting behavior of the cutting tool.

A cutting tool in accordance with the present invention is suggested in an earlier patent application P 35 02 346.5-14 in order to house a plurality of cutting blade holders, freely adjustable, in the most limited space. This proposal makes it possible to mount even two cutting blade holders, for instance in a shaft tool designed as a boring or milling tool in the same axial plane directly adjacent each other and yet assure free accessibility of the supporting members. It was found that the small cutting plates or cutting blades even can be positioned directly adjacent each other without any axial offset provided a countersunk head rest surface is designed suitably for the setscrew passing through the cutting blade holder. Much greater flexibility as to the composition or staggering of the cutting blades and/or cutting blade holders at the cutting tool was provided by this proposal.

Furthermore, an especially advantageous modification of this improved cutting tool is given if the supporting eccentric pin is received rotatably in a fitting recess of the cutting blade holder or of the tool holder. This earlier application suggests several possibilities of how to retain the eccentric pin in a close-tolerance recess. However, a feature which all of these solutions have in common is that they render the manufacture of the cutting blade holder or of the cutting tool more expensive to a greater or lesser extent. It is, therefore, an object of the instant invention to provide a cutting tool of the kind recited initially with which the fastening of the eccentric pins has only minimum effect on the costs. It is another object of the invention to provide a cutting tool of the kind specified which continues to safeguard that the eccentric pins are perfectly securely fixed in position.

These and other objects which will become apparent as the specification proceeds are met in that the supporting eccentric pin is held in the fitting recess by a hairpin-type spring.

SUMMARY OF THE INVENTION

The fastening in accordance with the invention is effected by an extremely small and light structural member which, moreover, can be produced at extremely low cost. This makes it possible to receive the eccentric pin in a recess which no longer requires the provision of an undercut surface. In this manner the manufacture of the close-tolerance or fitting recess is simplified significantly because the fitting surfaces which are to be brought into contact with the eccentric pin are accessible from outside so that they can be machined more easily. This provides the additional advantage that the eccentric pin is more easily replaceable whereby simple manipulations make it possible to vary to a greater or lesser extent the adjustment range by exchanging the eccentric pin.

An especially advantageous possibility of engagement between the hairpin-type spring and the eccentric pin is the embodiment has the specific advantage that the eccentric pin may be of symmetrical design so that it can be inserted in the fitting recess in any desirable manner without having to allow for the position of the hairpin-type spring. The guide groove provided in the central plane of the eccentric pin may be made rather roughly since the hairpin-type spring does not have to take over the lateral fixing of the eccentric pin. It is especially with an eccentric pin design, i.e. if the guide groove extends in the area of the eccentric portion, that the guide groove does not result in any noticeable weakening of the eccentric pin so that the load carrying capacity remains high as before.

It was found that a single hairpin-type spring is sufficient to retain all supporting and/or adjusting eccentric pins at the same time at a cutting blade holder. The extra expenditure for fixing the eccentric pin thus remains at a minimum level. The fastening of the eccentric pins continues to permit a rather wide variety in designing the eccentric pin. For instance, it is still possible to design the eccentric pin in accordance with the present invention so as to provide relatively great linear support of the cutting blade holder at the second recess surface. The guide groove in the eccentric pin may be made so narrow that the line of support is shortened only inconsiderably.

The hairpin-type spring may be fixed either at the tool body or at the cutting blade holder. However, it is especially advantageous to secure the hairpin-type spring at the cutting blade holder itself because in this manner the tool body can be fitted with a greater spectrum of different cutting blades requiring different conditions of the support geometry.

Favorable power transmission between the recess surfaces and the cutting blade holder is obtained by the further development according to the present invention. Varying the length of the central area across which the eccentric portion extends permits optimum harmonization of the supporting surfaces in the cutting blade holder and the deforming behavior of the eccentric pin and the frictional conditions in the range of the supports.

In the case of the further development according to present invention the structural space taken up by the cutting blade holder in any event is utilized in an advantageous manner for housing the eccentric portion while, at the same time, care is taken that the eccentric portion can be distributed all over the circumference of the eccentric pin whereby a particularly fine adjustment of the cutting blade holder, i.e. all the way into the $\mu$m range becomes possible. It proved that this structure is suitable to transmit even extreme pressures from the recess surfaces through the eccentric pins to the cutting blade holders and, as regards the mounting, this has the advantage that the cutting blade holder can be biased by the setscrew passing through the same before it is given its final fine adjustment. An open semicylindrical shell according to the present invention is sufficient for the design of the fitting recesses because the eccentric pins have to transmit nothing but pressures anyway. The configuration of the eccentric pin in accordance with the present invention makes it possible to distribute the eccentric total stroke across a maximum angle of 180°. For this reason even a medium surface roughness of the end portions of the eccentric pin and the semicylindrical surfaces receiving the same affords a self-locking condition so that additional means for retaining the eccentric pin in position may be dispensed with. Preferably, the contact surface of the fitting recess is tempered, for example nitrated in order to prolong the service life.

The same hairpin-type spring may be used to fix an adjusting pin according to the present invention in order that the cutting blade holder not only may be tilted but also adjusted in feeding direction. It proved that with this method of adjustment, too, the frictional forces between the eccentric portion and the supporting surface are so small that the accurate positioning of the cutting blade holder is not affected or falsified.

It is a special advantage of using the adjusting eccentric pin according to claim 3 that this affords the opportunity of relying on an outer surface of an adjacent cutting blade holder as the supporting surface for the adjusting eccentric pin, whereby the cutting tool can be made even more compact.

Advantageous embodiments of the hairpin-type spring are also included in the present invention.

The invention will be described further, by way of example, with reference to the accompanying drawings, in which.

DESCRIPTION OF THE PREFERRED EMBODIMENTS

Reference first will be made to FIGS. 1 and 2 showing a known special cutting tool marked by reference numeral 1. This tool serves for the chip-cutting machining of a plurality of functional surfaces 2 which are indicated by dash-dot lines and which are to be cut in a single operation such that a predetermined and closely tolerated association in position with respect to each other is given. To this end a plurality of cutting blade groups 3 to 5 are provided which are offset in axial and radial directions and each of which includes a plurality of small cutting plates or cutting blades each received in separate cutting blade holders, for example 44 to 46 of cutting blade group 4 and 54 to 56 of cutting blade group 5.

The cutting blade holders or cutting blade cassettes are adjustably secured at tool body 11 and for this purpose are substantially given the shape of a prism or parallelepiped each received in a recess which is adapted to the cross section of the parallelepiped. Each recess has two surfaces 61, 62, 71, 72, and 81, 82, respectively, extending at an angle with respect to each other. In FIGS. 1 and 2 the recesses of cutting blade group 4 are marked by index a and the recesses of cutting blade group 5 are marked by index b.

The angle included by the recess surfaces is adapted to the prism cross section of the cutting blade holders. Moreover, the recesses are of such configuration that the cutting blades each come to lie in radial planes 91 to 93. For this purpose each cutting blade holder has a planar surface at the side remote from the cutting blade for surface area contact with that recess surface 61, 71, 81, respectively, extending parallel to the associated radial plane 92, 93, 91, respectively. This will be referred to below as the first recess surface. The same applies to the cutting blade holders of the second group 4 of blades.

The cutting blade holders are guided in the form of rails so to speak in the recess. The cutting blade holders 44 to 46 and cutting blade holder 55 are supported on recess surface 82 by way of two points constituted by adjustable supporting screws or pins 12 and 13.

The individual cassettes are fastened immovably by being formed with a substantially central through bore 16 for receiving a rather solid setscrew 17 for which a corresponding threaded bore 18 is provided in the tool body 11. The screw 17 passes with clearance through the recess 16 of the associated cutting blade holder which has an engagement surface 20 for the head 19 of setscrew 17. The axis 21 of setscrew 17 lies in a plane forming an angle of substantially the same size with the two recess surfaces 61, 62 or 71, 72 or 81, 82, respectively. The axis 21 for example extends in a radial plane of the cutting tool 1. Upon tightening of the setscrew 17 normal forces are generated both on the first recess surface remote from the cutting blade and on the second recess surface adjacent the cutting blade. The flat planar support is effected by way of the recess surface 61, 71, or 81, respectively, which is substantially perpendicular to the cutting force acting on the main cutting blade.

The clearance S (cf. FIG. 1) between the inner bore 16 and the cassette and the shaft of setscrew 17 is great enough for accurate adjustment of the individual cutting blades with respect to one another since the threaded bore 18 in the tool body has been bored so accurately that a coarse preadjustment of the position is given.

Upon loosening of setscrew 17 and by twisting supporting screws 12 and 13 the cutting blade holder 53, 54, or 55 is pivoted, utilizing the clearance S and maintaining engagement by way of its planar surface, such that the main cutting edge of the corresponding cutting blade holder always remains in the predetermined radial plane 91 to 93.

An additional adjusting pin 23 engaging in an adjusting recess 24 of the respective cutting blade holder is associated with each cutting blade holder for adjustment of the same in a direction parallel to the axis of the cutting tool 1. The adjusting pin engages in an associated threaded bore 25 in tool body 11, and the recess 24 is adapted to a head 26 of the adjusting pin 23 such that upon screwing the adjusting pin 23 into the threaded bore 25 while setscrew 17 is released, the cutting blade holder (for example 55) is displaced in feeding direction V. The axial and radial offsets of the cutting blade holder marked $V_A$ and $V_R$ in FIGS. 1 and 2 can be minimized or eliminated by providing a cutting tool in accordance with the invention, designed as shown in FIGS. 3 to 12. For simplification of the specification, those structural members of the cutting tool embodiment shown in FIGS. 3 to 10 which correspond to those of FIGS. 1 and 2 are given the same reference numerals.

The embodiments according to FIGS. 3 to 12 differ from the cutting tool shown in FIGS. 1 and 2 substantially in that the cutting blade holders are supported in a different manner in a recess otherwise formed similarly in tool body 11. The cutting blade holders 110, 120, and 130 according to FIG. 3 which likewise are designed like parallelepipeds and received in a recess 111, 121, 131 adapted to the parallelepiped configuration comprise a milled-out portion 37 which in turn serves as a bearing surface for the head of the setscrew 17. In FIGS. 3 to 10 this milled-out portion is shown only diagrammatically. Likewise not shown is the inner bore opening into this milled-out portion 37 through which bore the shaft of setscrew 17 extends with clearance S. The setscrew presses the respective cutting blade holder flat against the first recess surfaces covered in FIGS. 3, 4, 9, and 10 by the cutting blade holder and designated by reference numerals 61, 71, and 81 in the case of the cutting tool shown in FIGS. 1 and 2. Reference numerals 112, 122, and 132 mark the second recess surfaces which extend at right angles with respect to the first recess surfaces and against which the cutting blade holders are supported by especially designed support members 200.

Figure 5:
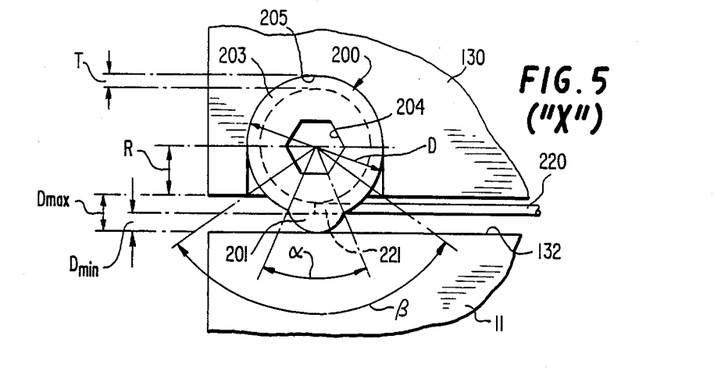
FIG. 5 is a view of the detail marked "X" in FIG. 3.

As shown in detail in FIG. 5, the support members 200 are constituted by supporting eccentric pins extending in a direction which is perpendicular to the first recess surface against which the cutting blade holder is pressed flatly with its surface. Rotation of the supporting eccentric pin 200 causes the eccentric portion 201 to travel so that the distance of the cutting blade holder from the second recess surface will change, whereby tilting adjustment is effected.

The principle of the eccentric adjustment may best be taken from the presentation of FIG. 5. The eccentric pin 200 comprises not only a cylindrical portion 202 but also an eccentric portion 201 which preferably extends across an angular range $\alpha$ which is approximately half as great as the angular range marked $\beta$ in FIG. 5 and covering the sector across which the supporting eccentric pin projects beyond the cutting blade holder 130. In its end surface 203 or its end surfaces the eccentric pin 200 is formed with a hexagonal recess 204 so that it can be twisted by a suitable tool. The eccentric pin 200 is guided by its cylindrical portion 202 in a part-cylindrical recess 205 in the cutting blade holder 130.

Figure 6:
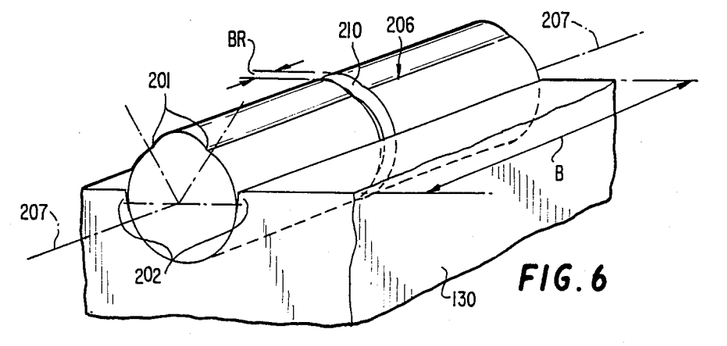
FIG. 6 is a perspective view, on an enlarged scale, of a supporting eccentric pin which is guidedly received in a cutting blade holder.

As shown in detail in FIG. 6, the eccentric pin 200 has a guide groove 210 in the area of its central plane and this is engaged by a bending portion 221 of a hairpin-type spring 220. The hairpin-type spring 220, for example, may be made of spring steel and has a thickness of approximately 0.5 mm. The width BR and the depth T of guide groove 210 are adapted to this thickness so that the hairpin-type spring 220 when resting on the bottom 211 of the groove does not protrude beyond the outside surface of the eccentric pin 200.

Figure 3:
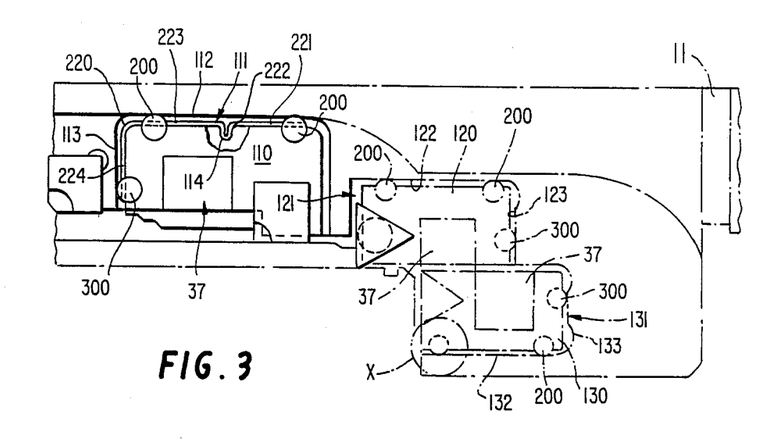
FIG. 3 is a view similar to FIG. 2 showing a first embodiment of the cutting tool according to the invention in an axial semisectional view.

In FIG. 3 the hairpin-type spring 220 is shown in the left upper part. It may be seen that a common hairpin-type spring 220 is coordinated with both supporting eccentric pins 200 and that it forms a bending loop 222 between the two supporting eccentric pins 200, the loop being received in a recess 114. The loop 222 may be adapted to the recess 114 in such manner that the hairpin-type spring 220 may snap into this recess so as to be releasably connected to the cutting blade holder 110. A glue or cement connection not specifically shown may be formed in this area as an additional means of securing. At the side remote from the spring portion 221 the loop 222 passes over into a spring portion 223 of corresponding design which engages in the guide groove 210 of the supporting eccentric pin 200. After a bend the spring portion 223 is continued in an extended portion 224 which is in abutting contact corresponding to portion 221 with a guide groove in an adjusting eccentric pin 300 which may be of the same design as the eccentric pin 200. Its purpose is to permit adjustment of the cutting blade holder also in axial direction or parallel to the second recess surface 112. All eccentric pins 200 and 300 thus are held in position by a single hairpin-type spring 220. Thus it is possible to dispense with undercut surfaces in the cutting blade holder 130 or in the tool body 11 for receiving the eccentric pins 200 or 300, as may be taken from FIGS. 5 and 6.

The maximum section $D_{max}$ can be reduced to the distance $D_{min}$ by applying a tool at the hexagonal recess 204 and twisting the eccentric pin 200 by the angle $(\beta-\alpha)/2$. The ratio between $D_{max}$ and $D_{min}$ may be predetermined suitably by suitable adaptation of the dimension R to the diameter D of eccentric pin 200.

The eccentric pin 200 may be of such design that it transmits the supporting force applied by setscrew 17 punctiformly or linearly to the tool body 11, the latter variant being illustrated in FIG. 6. In this case the eccentric pin is formed by a substantially cylindrical stud which includes a cam portion 206 throughout its length in that area in which it projects from the recess 205 acting as guide means. The cross section of the eccentric pin in this manner is the same throughout the length thereof.

Of course, it is likewise possible to design the eccentric pin such that it transmits the supporting force punctiformly.

Figures 7, 8:
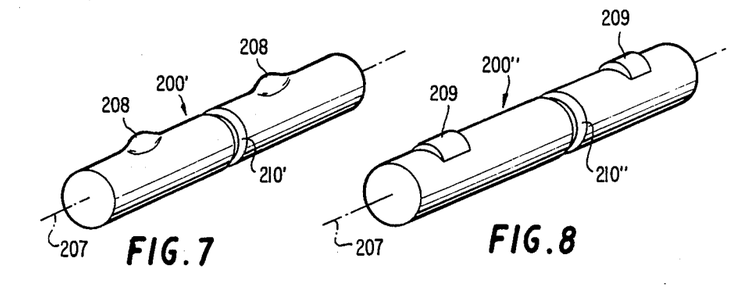
FIGS. 7 to 9 are perspective elevational views of three alternate embodiments of the supporting or adjusting eccentric pin.

In this case the guidance of the eccentric pin may be designed in the same way as shown in FIGS. 5 and 6. The eccentric pin thus again is substantially cylindrical. However, other than in the case of the embodiment shown in FIG. 6 it is merely provided selectively with at least one cam-like raised portion 208' so that tilting adjustment of the cutting blade holder may be effected by rotating the eccentric pin 200' Again a guide groove 210' is formed in the central plane of the pin 200' for engagement of the hairpin-type spring 220. During twisting of the eccentric pin 200 or 200' the hairpin-type spring slides along the bottom of the groove without, however, obstructing the adjusting movements.

FIG. 8 shows another embodiment of an eccentric pin 202" which differs from the one shown in FIG. 7 in that the knub-like raised portions 208 are substituted by eccentric part sections 209 which have the same cross sectional shape as in the case of the embodiment according to FIG. 6. Reference numeral 210" designates the central guide groove for hairpin-type spring 220.

Figure 9:
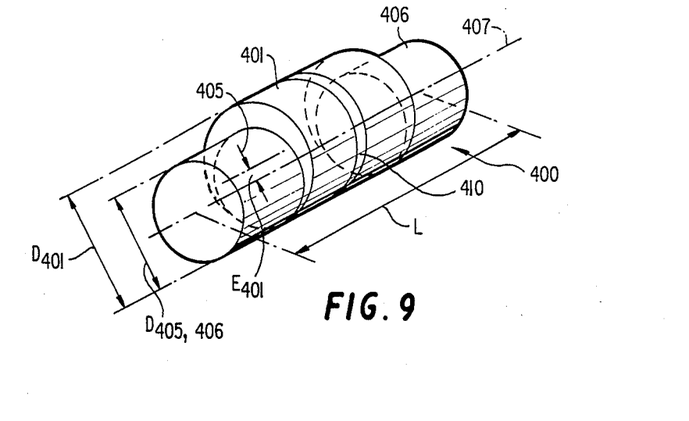

FIG. 9 shows an especially advantageous embodiment of the eccentric pin which in this presentation is designated by reference numeral 400. This eccentric pin which is shown on an enlarged scale in FIG. 9 preferably is used together with a cutting blade holder according to FIG. 10 which corresponds to cutting blade holder 120 according to FIG. 3 as regards the arrangement of the cutting blade and, therefore, is designated by the same reference numeral. Instead of having a milled-out portion 37 as shown in FIG. 3, the cutting blade holder 120 according to FIG. 10 has a cylindrical countersunk recess 124 to receive the head of the setscrew 17. The outer surface positioned opposite recess surface 122 according to FIG. 3 of the cutting blade holder is designated by reference numeral 124, and the outer surface opposite the other recess surface 123 of this cutting blade holder is marked 125. These surfaces 124 and 125, respectively, are formed with fitting recesses 127, the fitting recesses of surface 124 being offset with respect to the axis 21 of setscrew 17, i.e. being located at different sides of this axis. The fitting recesses are limited at the bottom of the recess by semicylindrical surfaces 128. The diameter of the semicylinder delimiting this surface corresponding to diameter $D_{405}$ or $D_{406}$ of the end portions 405 and 406, respectively, of the eccentric pin 400 according to FIG. 9. The length L of the eccentric pin 400 is somewhat smaller than the height H of the cutting blade holder 120. The eccentric pin 400 which carries an eccentric portion 401 of greater diameter between its two end portions 405 and 406 may be introduced in a direction perpendicular to the outer surfaces 124 and 125 into the fitting recesses because these outer surfaces are provided with an additional free space 126 the height $H_{126}$ of which is adapted to the length of eccentric portion 401. The diameter $D_{401}$ of eccentric portion 401 is greater than the diameter $D_{405}$ by an extent which corresponds to twice the dimension of the eccentricity $E_{401}$. This degree of eccentricity preferably lies in a range of between 3% and 10% of the diameter $D_{401}$.

Figure 10:
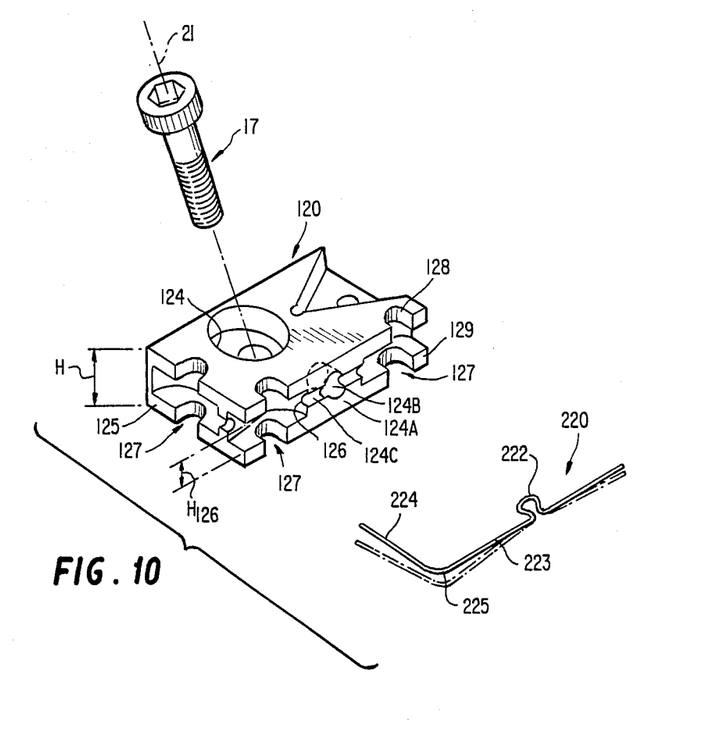
FIG. 10 is a perspective elevational view of a cutting blade holder for an eccentric pin as shown in FIG. 9.

For reasons of storage and assembly it is advantageous to handle the cutting blade holders with the individual eccentric pins 400 as a complete unit with which measures are taken to prevent the eccentric pins from sliding out of the fitting recesses. To this end the eccentric pin 400 again has a guide groove 410 in its central plane to receive the hairpin-type spring 220 described above. The cutting blade holder according to FIG. 10 is prepared correspondingly for reception of the hairpin-type spring. A recess 124B is formed in surface 224A to receive the loop portion 222 of hairpin-type spring 220. Additional exposed portions 124C and 124D are provided in the cutting blade holder and the individual portions of the hard metal spring 220 may extend through the same so as to guarantee that the hairpin-type spring 220 when inserted cannot be pressed against the abutment surfaces by the cutting blade holder in extreme positions of the eccentric pins. Preferably all spring portions are substantially inside the outline of the cutting blade holder in assembled condition.

It may be taken from FIG. 10 how the hairpin-type spring is deformed when inserted. The follow-up state upon assembly is indicated by dash-dot lines. Suitable configuration of the transition 225 between spring portion 223 and extended portion 224 may assure that a sufficiently strong securing force is exerted on the adjusting eccentric pin. There is a wide margin for such configuration of the bent or transitional portion 225 by the design of the recess 126 in the corner area of the cutting blade holder 120.

The eccentric pin 400 preferably is made of annealed steel of customary surface roughness, whereas the cutting blade holder 120, for example, is a casting in which the fitting recesses 127 have been provided during the casting. The close-tolerance surfaces preferably are nitrated. It was found that a favorable pairing of friction and sliding surfaces can be realized if an unmachined surface of a casting or high-quality casting provides the semicylindrical surface 128 and if the end portions 405 and 406 of the eccentric pin 400 have a mean roughness.

It may be gathered from the presentation in FIG. 3 that the adjustment of the individual cutting blade holders in the case of the cutting tool specified above is made from a direction which is parallel to the second recess surface 112, 122, or 132 and perpendicular to the first recess surface—in the case of the embodiment according to FIG. 3—against which surface the cutting blade holders are pressed flatly. This design makes it possible for cutting blade holders 120 and 130 to be arranged radially directly adjacent each other in the tool body. Moreover, the axial offset of these cutting blade holders can be kept very small because the setscrews 17 received in the milled-out portions 37 still are accessible because of their inclined position.

In contradistinction to the embodiment described above the adjusting pins also may be designed as shown in FIG. 2 with the particular feature that the axes 27 of the adjusting pins 23 shown are pivoted by 90° namely so as to extend parallel to the axes 207 or 407 of the supporting eccentric pins 200 or 400. With this embodiment the adjusting pin 23 engages in an adjusting recess 24 in the respective cutting blade holder and is in engagement with an associated threaded bore 25 in the tool body 11. The recess 24 is adapted to the head 26 of the adjusting pin such that the cutting blade holder is displaced in the advancing direction V when the pin 23 is screwed into the threaded bore 25 while the setscrew 17 is released. To this end a ramp angle $\gamma$ is provided, and the axis 27 of the adjusting pin 23 is disposed in a plane which likewise is perpendicular to the first recess surface of the tool body 11 against which surface the cutting blade holder is pressed flatly. In order not to overload the adjusting pin, the head 26 is supported at the end remote from recess 24 in a supporting recess adapted to the head 26 and formed in the tool body 11. The adjusting pin head may be of cylindrical shape and guided in a supporting recess adapted to this cylindrical configuration. The ramp-like adjusting recess 24 has a bottom which, when seen in section perpendicular to the axis 27 of adjusting pin 23, likewise has the shape or at least approximately the shape of a semicylinder which is identical with the cylinder of the adjusting pin head 26. Given this embodiment, the cutting blade holder may be displaced without canting substantially with parallel faces with respect to the first recess surface against which the cutting blade holder is clamped flatly when the blade angle is adjusted, taking recourse to the supporting eccentric pin 200.

Figure 4:
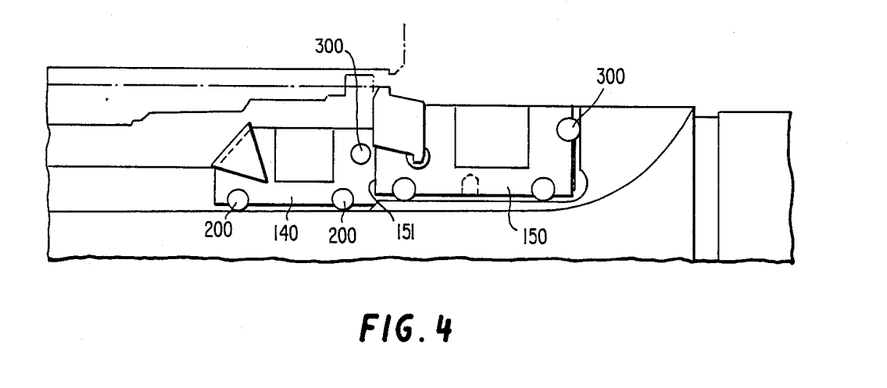
FIG. 4 is a view of the cutting tool shown in FIG. 3 in another axial section.

In the case of the embodiment according to FIG. 3 the adjusting eccentric pin 300 is supported against a recess surface 113, 123, or 133 of tool body 11. In the case of FIG. 4 this applies only to the cutting blade holder 150. The cutting blade holder 140 rests by way of the adjusting eccentric pin 300 on an outer surface 151 of cutting blade holder 150 adjacent the cutting blade holder 140.

Figure 11:
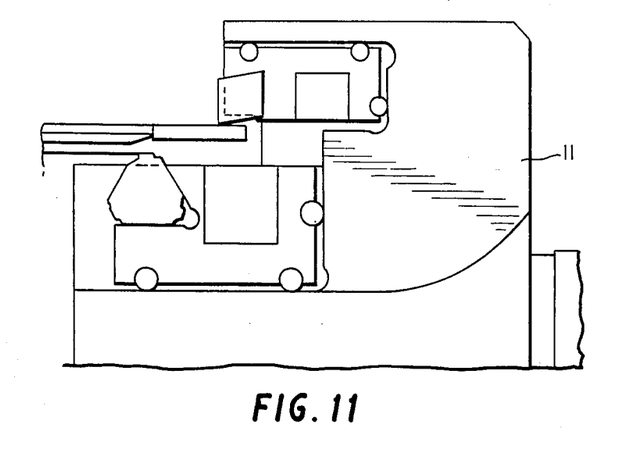
FIGS. 11 and 12 are presentations corresponding to FIGS. 3 and 4, respectively, of two further axial semisectional views of another embodiment of the cutting tool.
Figure 12:
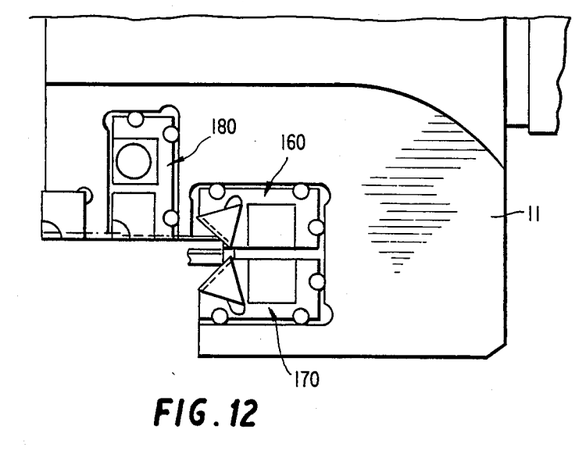

FIGS. 11 and 12 show further embodiments of the way in which different cutting blade holders are mounted on the tool body 11. The arrangement of the cutting blade holders 160 and 170 according to FIG. 10 is of special significance. With this embodiment neither an axial offset $V_A$ nor a radial spacing $V_R$ are required. Also the tightening of the setscrews (not shown) is possible since the heads of the setscrews 17 are sunk in the milled-out portions 37 the surfaces of which extend with respect to each other in a manner to leave sufficient free space for introduction of both corresponding setscrews 17 from outside and for tightening thereof by a suitable tool.

The adjustment of the cutting tool specified above is effected as follows: first the prismatic cutting blade holder is clamped loosely by the setscrew 17 in the corresponding recess so that the head of screw 17 is pressed at relatively small force on the head rest surface 20. By rotating the supporting eccentric pins 200, 200', 202', or 400 the cutting blade holder is tilted, the cutting edge being monitored optically, until the main cutting edge of the cutting blade has a desired angle with respect to the workpiece and the corner of the cutting blade comes to lie on the desired diameter. During these adjusting movements the cutting blade holder remains in surface area contact by its planar surface with the associated recess surface of the tool body 11. Upon adjustment of the blade angle and of the work diameter, the cutting blade holder is positioned in feeding direction V. This is accomplished by rotating either clamping pin 23 or adjusting eccentric pin 300. This does not cause any change in the adjustment of the cutting blade made by the supporting eccentric pins because the cutting blade holder can slide on the eccentric portions or knubs along the second recess surface cooperating with the same. Subsequently the central setscrew 17 is tightened.

Extremely great supporting forces can be transmitted especially by the embodiment of the eccentric pin 400 according to FIG. 9 and the cutting blade holder 120 according to FIG. 10 so that adjustments of the cutting blade holder in the μm range can be realized even if the cutting blade, holder already has been fixed in position roughly under a biasing force in the recess by means of setscrew 17.

In contradistinction to the embodiment of the cutting tool shown in the figures it is also possible to fix the supporting eccentric pins and/or the adjusting eccentric pins for the respective cassettes at the tool body by means of a hairpin-type spring. In further modification it is possible as well to provide a plurality of individual hairpin-type springs for the individual eccentric pins.

The invention thus provides a cutting tool comprising at least one exchangeable cutting blade mounted on a parallelepiped cutting blade holder which is adapted to be fixed to a tool body by a clamping or setscrew. The setscrew penetrates the cutting blade holder such that the holder is pressed flat against a first recess surface and, at the same time, in the direction of a second recess surface which extends at an angle with respect to the first one. The setscrew passes with clearance through the cutting blade holder for freely adjustable fastening such that it includes an angle of substantially the same size with both recess surfaces and presses the cutting blade holder against the second recess surface by way of two adjustable support members of which at least one is designed as a rotatable eccentric pin the axis of which extends substantially parallel to the associated second recess surface and which is supported in a fitting recess of the cutting blade holder or of the tool body. The eccentric pin is retained in the close-tolerance recess by means of a hairpin-type spring whereby a very simple and inexpensive combination of cutting blade holder and eccentric pin is obtained.

What is claimed is:

1. A cutting tool, comprising:
at least one exchangeable cutting blade mounted on a parallelpiped cutting blade holder which is adapted to be fixed at a tool body by a setscrew passing through the cutting blade holder such that the holder is pressed flat against a first recess surface and, at the same time, in the direction of a second recess surface extending at an angle with respect to the first one, the setscrew penetrating the cutting blade holder with clearance for freely adjustable fastening such that it includes an angle of substantially the same size with both recess surfaces and presses the cutting blade holder against the second recess surface by two adjustable support members (200) of which at least one is designed as a rotatable eccentric supporting pin the axis of which extends substantially parallel to the associated second recess surface and which is supported in a fitting recess of the cutting blade holder or of the tool body, and
a hairpin-type (220) spring having a bending portion (221) wherein the supporting eccentric pin (220;400;220';202') is resiliently held in the fitting recess (205;127) by engaging said bending portion (221) of said hairpin-type spring (220).

2. The cutting tool as claimed in claim 1, wherein both adjustable support members (200) are of identical design and further comprising a common hairpin-type spring (220) for biasing said adjustable support members.

3. The cutting tool as claimed in claim 2, comprising additional adjusting means which includes an eccentric adjusting pin which extends parallel to the supporting eccentric pins and is designed, guided, and adjustable in an identical manner as those supporting the cutting blade holders thereof against a support surface which is perpendicular to both recess surfaces, wherein the adjusting eccentric pin (300) is biased by the common hairpin-type spring (220).

4. The cutting tool as claimed in claim 3, wherein the hairpin-type spring (220) is disposed in a central plane of the cutting blade, holder and engages a central guide groove (210;210';210'';410) of the supporting eccentric pin, the guide groove having a depth (T) which is greater than the thickness of the hairpin-type spring (220).

5. The cutting tool as claimed in claim 4, wherein the hairpin-type spring (220) is insertable by a spring loop portion (222) in a recess (114;124B) between the two supporting eccentric pins, a first spring portion (221) extending toward the first supporting eccentric pin (220) and a second spring portion (223) extending toward the second supporting eccentric pin.

6. The cutting tool as claimed in claim 5, wherein the second spring portion (223) is continued in an extended portion (224) which is bent with respect to the same and the cantilever end of which is in engagement with the adjusting eccentric pin (300).

7. The cutting tool as claimed in claim 5 or 6, wherein the hairpin-type spring (220) is inserted removably in the recess.

8. The cutting tool as claimed in claim 5 or 6, wherein the hairpin-type spring is cemented in the recess.

9. The cutting tool as claimed in claim 1, wherein the supporting eccentric pin (200) has an eccentric portion (201) extending across the entire width (B) of the cutting blade holder (130) facing the second recess surface (132).

10. The cutting tool as claimed in claim 1, wherein the supporting eccentric pin (200;200';202') comprises a substantially cylindrical stud which protrudes laterally throughout its length from a guide recess (205) in which it is retained and includes a cam portion (206;208;209).

11. The cutting tool as claimed in claim 1, which comprises at least one supporting eccentric pin (400) having an eccentric portion (401) which extends across a central area ($H_{126}$) of the surface (124A) facing the second recess surface (122) of the cutting blade holder.

12. The cutting tool as claimed in claim 11, wherein the fitting recesses (127) are defined in the bottom of the recess by semicylindrical surfaces (128).

13. The cutting tool as claimed in claim 11, wherein the degree of eccentricity ($E_{401}$) of the eccentric portion (401) is in the range between 3% and 10% of the diameter ($D_{401}$) of the eccentric portion (401).

14. The cutting tool as claimed in claim 11, wherein the supporting eccentric pin (400) is formed by a stepped cylindrical stud carrying between its concentric end portions (405,406) by which it is supported in fitting recesses (127) of the cutting blade holder (120) a cylindrical eccentric portion (401) of a greater diameter ($D_{401}$) for which a free space (126) is formed in the cutting blade holder (120).

15. The cutting tool as claimed in claim 14, characterized in that the semicylindrical surfaces (128) and the outside surfaces of the concentric end portions (405;406) of the eccentric pin (400) have surface roughnesses which are mutually adjusted.

16. The cutting tool as claimed in claim 1, wherein the supporting eccentric pin (400;200) is provided with a hexagonal recess (204;404) in its end face (203;403) for rotational adjustment.

17. The cutting tool as claimed in claim 1, wherein the supporting eccentric pins (200;400) are offset in opposed directions with respect to the axis (21) of the setscrew (17).

18. The cutting tool as claimed in claim 1, wherein the hairpin-type spring is made of spring steel.

19. The cutting tool as claimed in claim 1, wherein the hairpin-type spring lies substantially within the outer contour of the cutting blade holder which is formed with corresponding recess (124C and 124D) for this purpose.

20. The cutting tool as claimed in claim 1, wherein the hairpin-type spring (220) has a thickness of approximately 0.5 mm.

21. The cutting tool as claimed in claim 1, wherein the support surface is formed by a recess surface (113;123;133) of the tool body (11).

22. The cutting tool as claimed in claim 1, wherein the support surface is formed by an outer surface (151) of an adjacent cutting surface holder (150).

* * * * *